US009685003B2

(12) United States Patent
Lazarow et al.

(10) Patent No.: US 9,685,003 B2
(45) Date of Patent: Jun. 20, 2017

(54) MIXED REALITY DATA COLLABORATION

(71) Applicant: MICROSOFT TECHNOLOGY LICENSING, LLC, Redmond, WA (US)

(72) Inventors: Gavin Lazarow, Bellevue, WA (US); Frederik Schaffalitzky, Bellevue, WA (US); Dan Hou, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 464 days.

(21) Appl. No.: 13/908,816

(22) Filed: Jun. 3, 2013

(65) Prior Publication Data

US 2014/0354685 A1 Dec. 4, 2014

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G02B 27/0172* (2013.01); *G02B 2027/014* (2013.01); *G02B 2027/0187* (2013.01); *G06F 3/14* (2013.01); *G06T 2219/024* (2013.01); *G09G 2350/00* (2013.01); *G09G 2370/022* (2013.01)

(58) Field of Classification Search
CPC ..... G09G 5/12; G06T 10/006; G02B 27/0172
See application file for complete search history.

(56) References Cited

U.S. PATENT DOCUMENTS 8,184,069 B1 * 5/2012 Rhodes ............................. 345/8
8,271,132 B2 9/2012 Nielsen et al.
(Continued)

OTHER PUBLICATIONS

Slamet, et al., "ManifoldSLAM: A Multi-Agent Simultaneous Localization and Mapping System for the RoboCup Rescue Virtual Robots Competition", retrieved at <<http://www.science.uva.nl/research/ias/alumni/m.sc.theses/theses/SlametPfingsthorn.pdf>> in MSc Thesis, Submitted to the Board of Examiners in Partial Fulfillment of the Requirements for the Degree of Master in Artificial Intelligence, Dec. 11, 2006, pp. 143.
(Continued)

*Primary Examiner* — William Beutel
(74) *Attorney, Agent, or Firm* — Alleman Hall Creasman & Tuttle LLP

(57) ABSTRACT

Embodiments that relate to sharing mixed reality experiences among multiple display devices are disclosed. In one embodiment, a method includes receiving current versions of a plurality of data subtypes geo-located at a keyframe location. A world map data structure is updated to include the current versions, and a neighborhood request including the keyframe location is received from a display device. Based on the keyframe location, an identifier and current version indicator for each data subtype is provided to the device. A data request from the device for two or more of the data subtypes is received, and the two or more data subtypes are prioritized based on a priority hierarchy. Based on the prioritization, current versions of the data subtypes are sequentially provided to the device for augmenting an appearance of a mixed reality environment.

20 Claims, 5 Drawing Sheets

(51) Int. Cl.
*G02B 27/01* (2006.01)
*G06F 3/14* (2006.01)

(56) References Cited

U.S. PATENT DOCUMENTS

| | | | |
|---|---|---|---|
| 9,017,163 B2* | 4/2015 | Newhouse et al. | 463/31 |
| 9,066,200 B1* | 6/2015 | Loxam et al. | |
| 2007/0182728 A1* | 8/2007 | Fujimori | G06F 3/1423 345/204 |
| 2008/0071816 A1* | 3/2008 | Gray | 707/101 |
| 2009/0048010 A1* | 2/2009 | Kroeckel et al. | 463/13 |
| 2010/0287485 A1* | 11/2010 | Bertolami et al. | 715/764 |
| 2011/0032259 A1* | 2/2011 | Kim | A61B 1/041 345/428 |
| 2012/0015730 A1* | 1/2012 | Watkins et al. | 463/36 |
| 2012/0105473 A1* | 5/2012 | Bar-Zeev et al. | 345/633 |
| 2012/0110002 A1* | 5/2012 | Giambalvo | G06F 17/30572 707/769 |
| 2012/0122570 A1* | 5/2012 | Baronoff | 463/31 |
| 2012/0249741 A1* | 10/2012 | Maciocci et al. | 348/46 |
| 2012/0253653 A1 | 10/2012 | Burroughs et al. | |
| 2012/0263154 A1* | 10/2012 | Blanchflower et al. | 370/338 |
| 2013/0054682 A1 | 2/2013 | Malik et al. | |
| 2013/0117377 A1* | 5/2013 | Miller | H04L 67/38 709/205 |
| 2013/0314340 A1* | 11/2013 | Shimohata | G06F 3/01 345/173 |
| 2014/0192164 A1* | 7/2014 | Tenn et al. | 348/47 |
| 2014/0267419 A1* | 9/2014 | Ballard et al. | 345/633 |
| 2014/0323148 A1* | 10/2014 | Schmalstieg et al. | 455/456.1 |
| 2014/0344139 A1* | 11/2014 | Smith et al. | 705/39 |

OTHER PUBLICATIONS

Maleki, et al., "Scorpius Team Description Paper Virtual Robot Competitions", Retrieved at <<http://ceit.aut.ac.ir/~valipour/publications/TRs/en/Scorpius_Virtual_Robot_TDP.pdf>> Retrieved Date: Mar. 6, 2013, pp. 7.

Adobbati, et al., "Gamebots: A 3D Virtual World Test-Bed for Multi-Agent Research", Retrieved at <<http://act-r.psy.cmu.edu/~douglass/Douglass/Agents/PDF/Gamebots-3D-Testbed.pdf>> In Proceedings of the Second International Workshop on Infrastructure for Agents, MAS, and Scalable MAS, May 2001, pp. 6.

Dragone, et al., "A Programming Framework for Multi-Agent Coordination of Robotic Ecologies", Retrieved at <<http://www.fp7rubicon.eu/uploads/promas2012-mbl.pdf>> In Tenth International Workshop on Programming Multi-Agent Systems, Jun. 5, 2012, pp. 16.

* cited by examiner

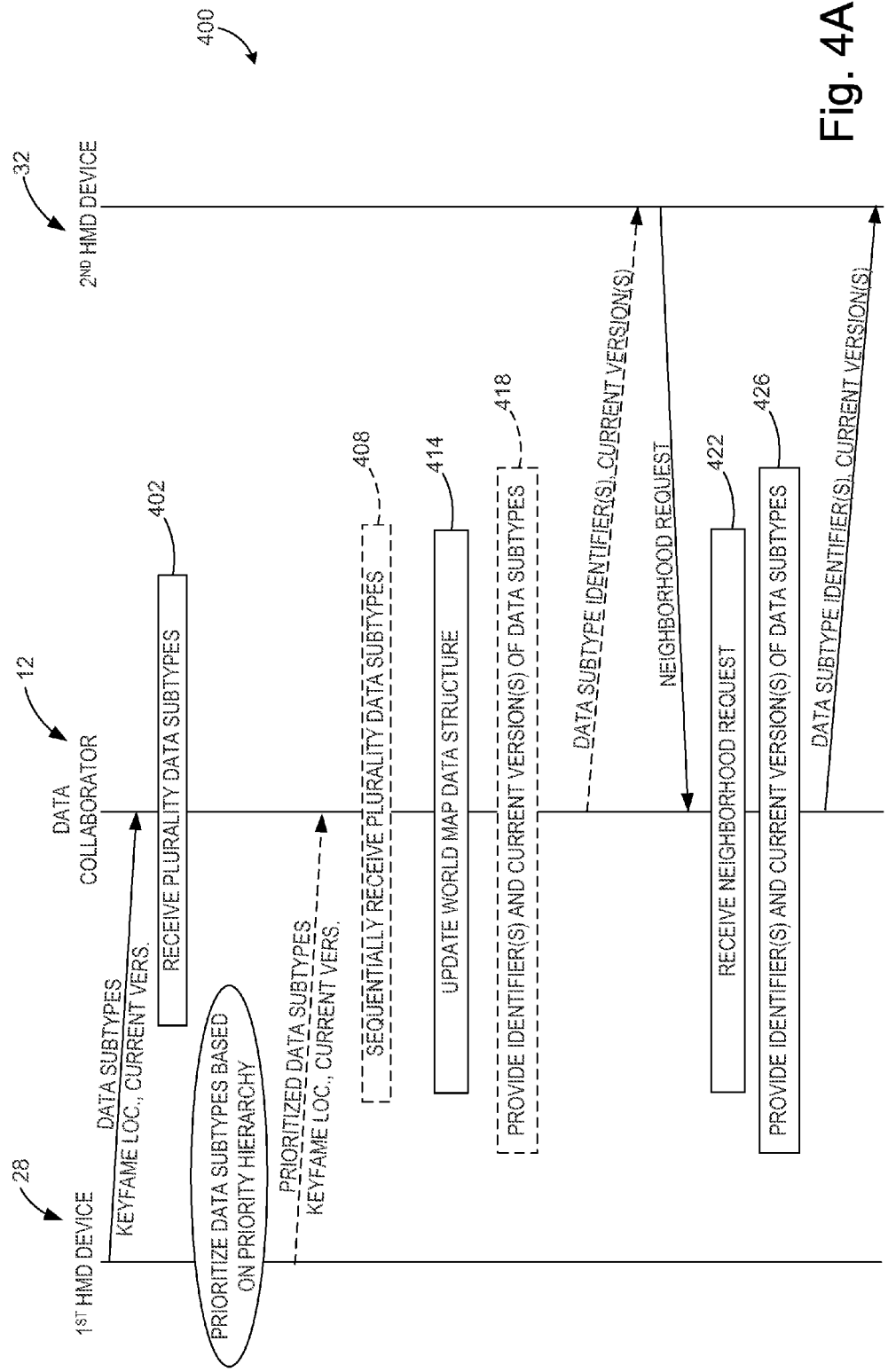

MIXED REALITY DATA COLLABORATION

BACKGROUND

Sharing mixed reality experiences among two or more users or game players can provide compelling gaming and other user experiences. Particularly in contexts where users or players are mobile, mapping, integrating and sharing the information gathered into a consistent model and depicting that information as a given representation for each user or player can prove challenging. For example, in simultaneous location and mapping (SLAM) systems, a moving sensor platform simultaneously may build a representation of an environment (map) while tracking its position within the map. In some examples, multiple platforms may traverse portions of the same physical environment and generate platform-specific map data. For these platforms to have shared experiences that incorporate the common physical environment, map data may be shared among the platforms.

In one example, each platform may share all of its map data with each other platform. Each platform may thereby have access to all of the map data generated by all other platforms. However, the data storage capacity necessitated for each platform in this example may be extremely large and commercially impractical, particularly for data-rich environments involving large maps. An example of a data-rich environment may be a mixed reality experience that includes representations of three-dimensional holographic objects, virtual representations of physical environments, audio data from the environments, etc. Further, where the moving sensor platforms operate in low bandwidth environments, sharing excessive amounts of data can result in unacceptable latency issues and corresponding negative user experiences.

SUMMARY

Various embodiments are disclosed herein that relate to sharing mixed reality experiences. For example, one disclosed embodiment provides a method for enabling two or more display devices to share mixed reality experiences. The method includes receiving a plurality of data subtypes from a first display device, with each of the data subtypes being geo-located at a keyframe location and having a current version. A world map data structure is updated to include the current versions of the data subtypes at the keyframe location. A neighborhood request is received that includes the keyframe location from a second display device.

In response to the neighborhood request and based on the keyframe location, an identifier for each of the plurality of data subtypes and a current version indicator for each of the plurality of data subtypes is provided to the second display device. A data request is then received from the second display device for two or more of the plurality of data subtypes. The two or more data subtypes are prioritized based on a priority hierarchy. Based on the prioritization, current versions of the two or more data subtypes are sequentially provided to the second display device, wherein an appearance of a mixed reality environment generated via the second display device is augmented using the current versions of the two or more data subtypes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are a flow chart of a method for enabling display devices to share mixed reality experiences according to an embodiment of the present disclosure.

DETAILED DESCRIPTION

Figure 1:
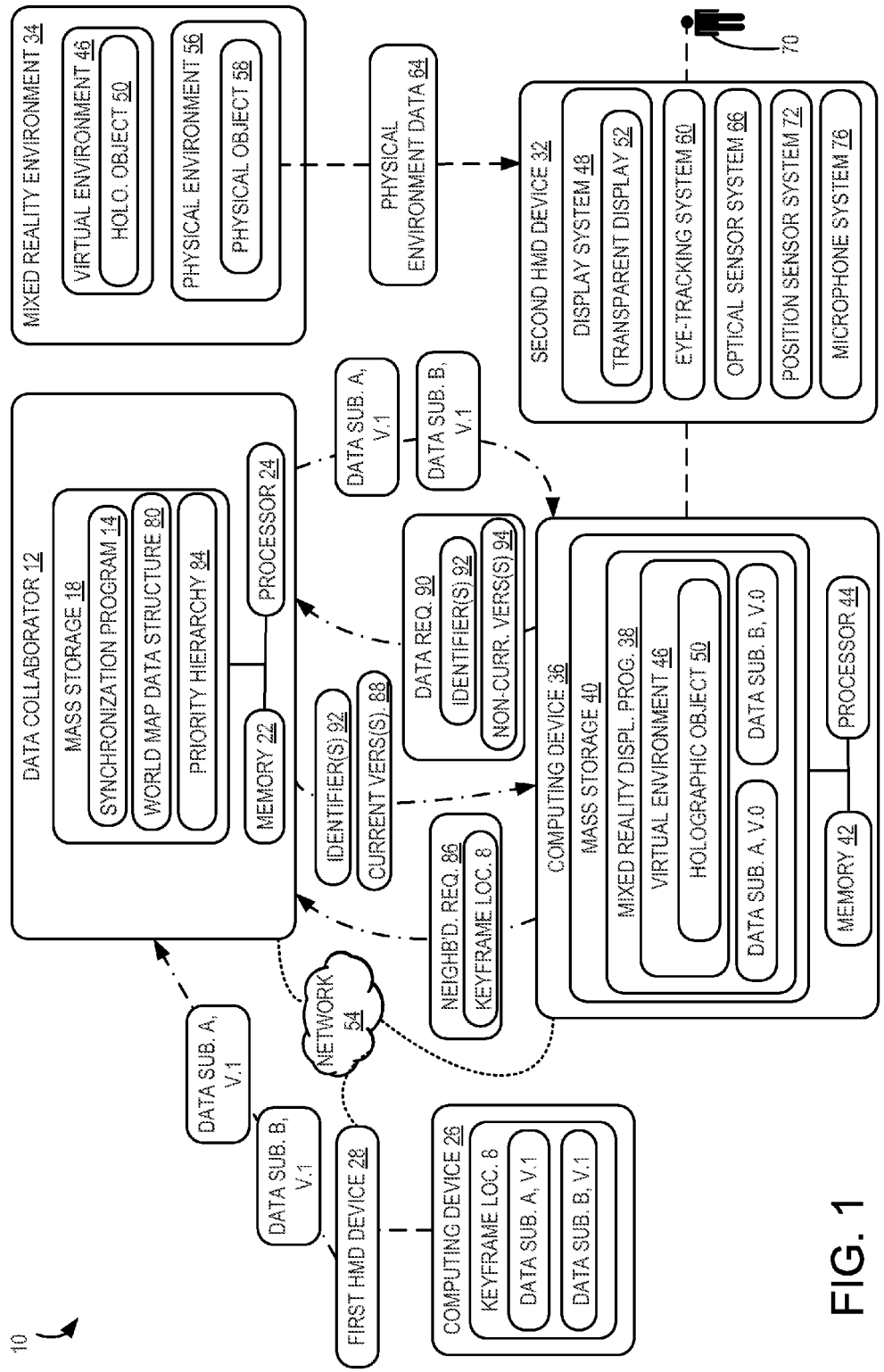
FIG. 1 is a schematic view of a mixed reality collaboration system according to an embodiment of the present disclosure.

FIG. 1 shows a schematic view of one embodiment of a mixed reality collaboration system 10. The mixed reality collaboration system 10 includes a data collaborator 12 that may take the form of a computing device. As described in more detail below, the data collaborator 12 includes a synchronization program 14 that may be stored in mass storage 18 of the data collaborator. The synchronization program 14 may be loaded into memory 22 and executed by a processor 24 of the data collaborator 12 to perform one or more of the methods and processes described in more detail below.

The mixed reality collaboration system 10 may include a plurality of display devices that are communicatively coupled to the data collaborator 12. In the example shown in FIG. 1, the display devices take the form of a first head-mounted display (HMD) device 28 and second HMD device 32, each of which may create mixed reality environments. The first HMD device 28 is communicatively coupled to computing device 26, and the second HMD device 32 is communicatively coupled to computing device 36. For ease of description, it will be appreciated that the following description of the components and computing aspects of computing device 36 may also describe computing device 26.

Computing device 36 may include a mixed reality display program 38 that may be stored in mass storage 40, loaded into memory 42 and executed by a processor 44 to generate a virtual environment 46 for display via second HMD device 32. The virtual environment 46 may include one or more virtual images, such as three-dimensional (3D) holographic objects and two-dimensional (2D) virtual images, that are generated and displayed via second HMD device 32. In the example shown in FIG. 1, the virtual environment 46 includes holographic object 50.

The computing device 36 may be operatively connected with the second HMD device 32 using a wired connection, or may employ a wireless connection via WiFi, Bluetooth, or any other suitable wireless communication protocol. For example, the computing device 36 and second HMD device 32 may be communicatively coupled to a network 54. The network 54 may take the form of a local area network (LAN), wide area network (WAN), wired network, wireless network, personal area network, or a combination thereof, and may include the Internet. Additionally, the example illustrated in FIG. 1 shows the computing device 36 as a separate component from the second HMD device 32. It will be appreciated that in other examples the computing device 36 may be integrated into the second HMD device 32.

The computing device 36 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 36 are described in more detail below with reference to FIG. 5.

In other examples, the mixed reality collaboration system 10 may include one or more other display devices that are communicatively coupled to the data collaborator 12 and may be capable of providing mixed reality experiences. Such display devices may include, but are not limited to, hand-held smart phones, e-readers, laptop, notebook and tablet computers, etc. It will be appreciated that many other types and configurations of display devices having various form factors, whether separate from or integrated with a computing device, may also be used and are within the scope of the present disclosure.

Figure 2:
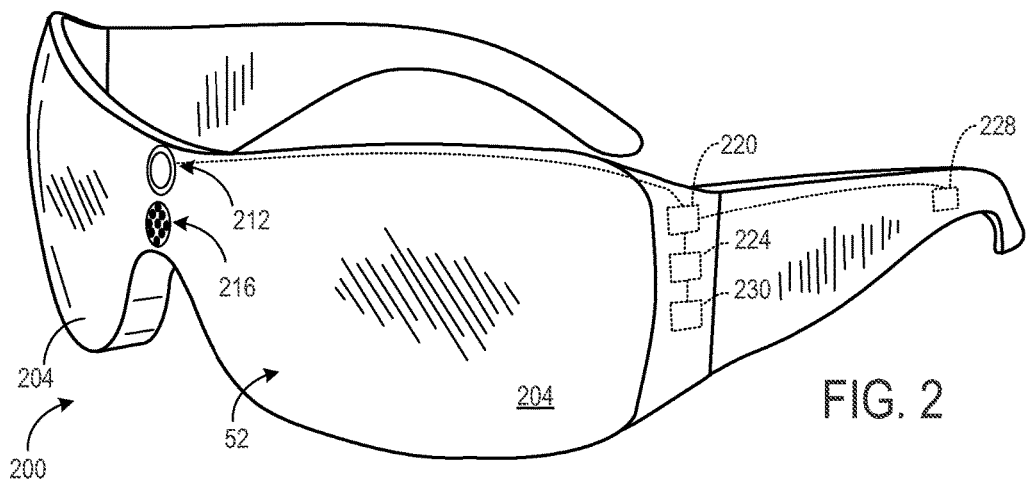
FIG. 2 shows an example head-mounted display device according to an embodiment of the present disclosure.

With reference now also to FIG. 2, one example of an HMD device 200 in the form of a pair of wearable glasses with a transparent display 52 is provided. It will be appreciated that in other examples, the HMD device 200 may take other suitable forms in which a transparent, semi-transparent or non-transparent display is supported in front of a viewer's eye or eyes. It will also be appreciated that the first HMD device 28 and/or second HMD device 32 shown in FIG. 1 may take the form of the HMD device 200, as described in more detail below, or any other suitable HMD device. For ease of description, the following description refers to the second HMD device 32.

With reference to FIGS. 1 and 2, the second HMD device 32 includes a display system 48 and transparent display 52 that enables images such as holographic objects to be delivered to the eyes of a user 70. The transparent display 52 may be configured to visually augment an appearance of a physical environment 56 to a user 70 viewing the physical environment through the transparent display. For example, the appearance of the physical environment 56 may be augmented by graphical content (e.g., one or more pixels each having a respective color and brightness) that is presented via the transparent display 52 to create the mixed reality environment 34.

The transparent display 52 may also be configured to enable a user to view a physical, real-world object 58 in the physical environment 56 through one or more partially transparent pixels that are displaying a virtual object representation. As shown in FIG. 2, in one example the transparent display 52 may include image-producing elements located within lenses 204 (such as, for example, a see-through Organic Light-Emitting Diode (OLED) display). As another example, the transparent display 52 may include a light modulator on an edge of the lenses 204. In this example the lenses 204 may serve as a light guide for delivering light from the light modulator to the eyes of a user. Such a light guide may enable a user to perceive a 3D holographic image located within the physical environment 56 that the user is viewing, while also allowing the user to view physical objects in the physical environment, thus creating a mixed reality environment.

The second HMD device 32 may also include various sensors and related systems. For example, the second HMD device 32 may include an eye-tracking system 60 that utilizes at least one inward facing sensor 212. The inward facing sensor 212 may be an image sensor that is configured to acquire image data in the form of eye tracking data from a user's eyes. Provided the user has consented to the acquisition and use of this information, the eye-tracking system 60 may use this information to track a position and/or movement of the user's eyes.

The second HMD device 32 may also include sensor systems that receive physical environment data 64 from the physical environment 56. For example, the second HMD device 32 may include an optical sensor system 66 that utilizes at least one outward facing sensor 216, such as an optical sensor, to capture image data. Outward facing sensor 216 may detect movements within its field of view, such as gesture-based inputs or other movements performed by a user 70 or by a person or physical object within the field of view. Outward facing sensor 216 may also capture two-dimensional image information and depth information from physical environment 56 and physical objects within the environment. For example, outward facing sensor 216 may include a depth camera, a visible light camera, an infrared light camera, and/or a position tracking camera.

The second HMD device 32 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 216 may capture images of the physical environment 56 in which a user 70 is situated. In one example, the mixed reality display program 38 may include a 3D modeling system that uses such input to generate a virtual environment 46 that models the physical environment 56 surrounding the user 70.

The second HMD device 32 may also include a position sensor system 72 that utilizes one or more motion sensors 220 to capture position data, and thereby enable motion detection, position tracking and/or orientation sensing of the HMD device. For example, the position sensor system 72 may be utilized to determine a direction, velocity and acceleration of a user's head. The position sensor system 72 may also be utilized to determine a head pose orientation of a user's head. In one example, position sensor system 72 may comprise an inertial measurement unit configured as a six-axis or six-degree of freedom position sensor system. This example position sensor system may, for example, include three accelerometers and three gyroscopes to indicate or measure a change in location of the second HMD device 32 within three-dimensional space along three orthogonal axes (e.g., x, y, z), and a change in an orientation of the HMD device about the three orthogonal axes (e.g., roll, pitch, yaw).

Position sensor system 72 may also support other suitable positioning techniques, such as GPS or other global navigation systems. Further, while specific examples of position sensor systems have been described, it will be appreciated that other suitable position sensor systems may be used. In some examples, motion sensors 220 may also be employed as user input devices, such that a user may interact with the second HMD device 32 via gestures of the neck and head, or even of the body. The second HMD device 32 may also include a microphone system 76 that includes one or more microphones 224 that capture audio data. In other examples, audio may be presented to the user via one or more speakers 228 on the second HMD device 32.

The second HMD device 32 may also include a processor 230 having a logic subsystem and a storage subsystem, as discussed in more detail below with respect to FIG. 5, that are in communication with the various sensors and systems of the HMD device. In one example, the storage subsystem may include instructions that are executable by the logic subsystem to receive signal inputs from the sensors and forward such inputs to computing device 36 (in unprocessed or processed form), and to present images to a user via the transparent display 52.

It will be appreciated that the second HMD device 32 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the second HMD device 32 may include additional and/or alternative sensors, cameras, microphones, input devices, output devices, etc. without departing from the scope of this disclosure. Further, the physical configuration of the second HMD device 32 and its various sensors and subcomponents may take a variety of different forms without departing from the scope of this disclosure. Additionally, the first HMD device 28 may have the same, similar or different construction and operation as the above-described second HMD device 32.

Figure 3:
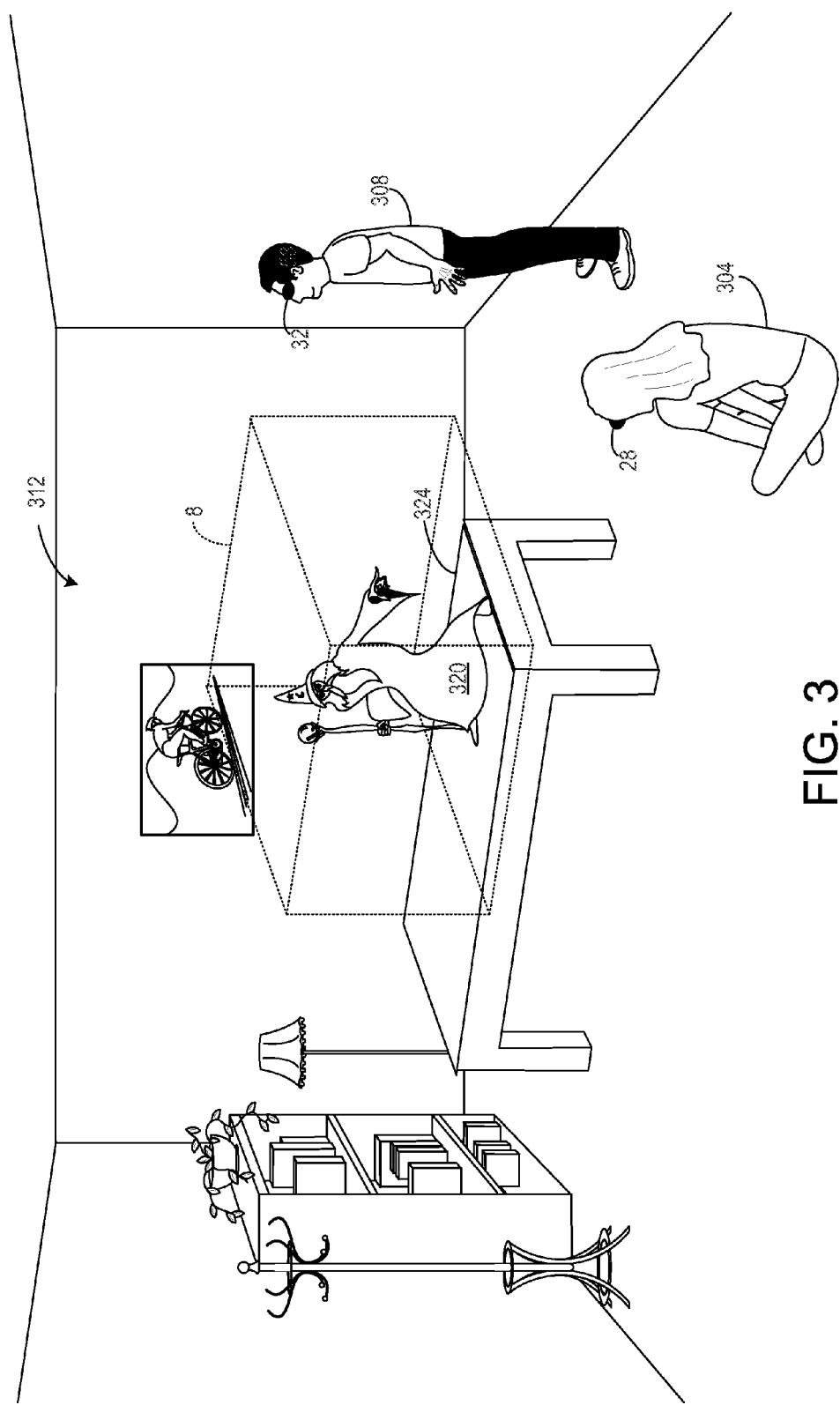
FIG. 3 is a schematic perspective view of two users wearing head-mounted display devices of FIG. 2 and located in a room.

With reference now to FIGS. 1 and 3, descriptions of example use cases and embodiments of the mixed reality collaboration system 10 including data collaborator 12 and related methods will now be provided. FIG. 3 provides a schematic illustration of a first user 304 and a second user 308 located in a physical environment that comprises a living room 312. The first user 304 wears a first HMD device 28 in the form of HMD device 200 and the second user 308 wears a second HMD device 32 in the form of HMD device 200. It will be appreciated that references to first HMD device 28 and second HMD device 32 include associated computing device 26 and associated computing device 36, respectively, as described above.

With reference now to FIG. 3 and as described in more detail below, data collaborator 12 may be configured to enable the first user 304 and second user 308 to experience a shared mixed reality environment via their respective HMD devices. It will also be appreciated that in other examples, one or more additional HMD devices or other display devices may interact with data collaborator 12 to also share mixed reality experiences with the first HMD device 28 and second HMD device 32.

In the example illustrated in FIG. 3, the first HMD device 28 may generate a virtual environment that includes a holographic wizard 320 located on table 324. The first user 304 may view the holographic wizard 320 via the first HMD device 28. The first HMD device 28 may also capture a variety of physical environment data 64 from the room 312, such as images of objects in the room, depth camera data from objects in the room, etc. The first HMD device 28 may also capture position data such as, for example, location coordinates of the first HMD device 28 and various objects and surfaces in the room 312, head pose data of the first user 304, etc. It will be appreciated that the holographic wizard 320 may also be assigned to a particular location in the room 312, which position and corresponding location coordinates may be stored by the first HMD device 28.

At periodic intervals, snapshots of the physical environment data 64 and virtual environment data, including data related to the holographic wizard 320, may be captured by the first HMD device 28. The various forms of such physical environment data 64 and virtual environment data may be collected into a plurality of data subtypes. Advantageously, and as described in more detail below, utilizing data subtypes in this manner enables various types of data to be grouped into modular units, thereby potentially improving the efficiency of data transfer between display devices and the data collaborator 12.

One or more of the data subtypes may be geo-located at a keyframe location within the mixed reality environment 34. Accordingly, a keyframe location may include a plurality of data subtypes that are geo-located at the keyframe location. A keyframe location may be defined as a location within three-dimensional space of a physical environment. In one example and with reference to FIG. 3, the room 312 may be defined as a keyframe location.

In other examples, smaller units within the room 312 may be defined as different keyframe locations. For example, the room may be divided into 1 $m^3$ volumes of space, each of which may be designated as a different keyframe location. An example keyframe location 8 is illustrated in FIG. 3. It will be appreciated that any suitable volume of space may be utilized as a keyframe location. In this manner, a consistent world map data structure 80 may be created that represents a three-dimensional region of a physical environment and includes a plurality of keyframe locations within that environment, with each keyframe location including one or more data subtypes.

The data subtypes included in a keyframe location may include, but are not limited to: pose link transforms that comprise three-dimensional transforms between one or more virtual objects in a keyframe location and objects in one or more other nearby keyframe locations; anchor transforms that comprise three-dimensional transforms between a current keyframe and any anchors attached to the current keyframe; tracking images that comprise small image patches such as, for example, 16×16 pixel patches, that are extracted from a keyframe image and may be used to track between keyframe locations; scene images that comprise one or more images captured from the keyframe location; correspondences between two-dimensional image coordinates or feature points from a scene image and the three-dimensional location where the image coordinate or feature point is observed; keyframe metadata comprising a GPS or other location of the capturing HMD device, data related to the capturing HMD device, and WiFi data from the moment the keyframe data was captured; keyframe descriptors that comprise descriptive aspects of the keyframe; three-dimensional relocalization points for virtual images in the keyframe location; quantizations of keyframe descriptors; and rig-to-rig transforms.

With reference again to FIG. 3 and as noted above, the first HMD device 28 may capture a variety of physical environment data 64 from the room 312. The first HMD device 28 may also generate a virtual environment 46 including holographic wizard 320 located on the table 324. In one example, the wizard 320 may be located in keyframe location 8 in the room 312. Upon the initial generation of the holographic wizard 320 in keyframe location 8, a plurality of data subtypes that correspond to the initial generation of the wizard in keyframe location 8 may be designated as version 1, or a current version. For example and with reference again to FIG. 1, the first HMD device 28 may generate a data subtype A, version 1 and a data subtype B, version 1 that each correspond to the initial generation of the holographic wizard 320 at keyframe location 8. The first HMD device 28 may then upload data subtype A, version 1 and a data subtype B, version 1 along with associated keyframe location 8 to the data collaborator 12.

The synchronization program 14 in the data collaborator 12 may be configured to receive data subtype A and data subtype B from the first HMD device 28. In one example, prior to providing data subtype A and data subtype B, the first HMD device 28 may prioritize the data subtypes based on a priority hierarchy 84. Advantageously, the data subtypes may be prioritized in order of their utility and importance to the data collaborator 12 in enabling shared mixed reality experiences among a plurality of display devices.

Criteria for defining priority hierarchy 84 may include, for example, the importance of a data subtype for enabling an HMD device to realistically display a holographic object. In this example, those data subtypes that are most helpful for enabling realistic display of holographic objects may be prioritized higher than less helpful subtypes. Other criteria for defining a priority hierarchy 84 may include, for example, characteristics of a data subtype that may consume large amounts of bandwidth and thereby negatively affect perceived latency. For example, the larger the size of a data subtype, the more likely it may have the undesirable effect of increasing perceived latency. A scene image from a keyframe location, for example, may have a relatively larger size as compared to other data subtypes, which may lower its position in a priority hierarchy 84. It will be appreciated that other suitable criteria for defining a priority hierarchy 84 may also be utilized.

In one example, the priority hierarchy 84 may comprise a first priority that includes anchor transforms, a second priority that includes scene images and is lower than the first priority, and a third priority that includes three-dimensional keyframe relocalization points and is lower than the second priority. It will also be appreciated that the priority hierarchy 84 may comprise 2, 4, 5 or any suitable number of priority levels. In this example, the synchronization program 14 may be configured to sequentially receive the plurality of data subtypes from the first HMD device 28 based on the priority hierarchy 84. Alternatively expressed, the data subtypes may be provided and received in order from high to low priority.

Upon receiving the data subtypes from the first HMD device 28, the synchronization program 14 is configured to update a world map data structure 80 to include the current versions of the data subtypes at the keyframe location 8. In this example, the current versions include data subtype A, version 1 and data subtype B, version 1. Accordingly, for each of the data subtypes, the synchronization program 14 may be configured to increment the version number associated with the data subtype that is stored in the world map data structure 80. In the present example, the synchronization program 14 may increment the version number for both data subtype A and data subtype B from 0 to 1. It will also be appreciated that in some examples a data subtype for a keyframe location may have 2 or more versions stored in the world map data structure 80.

In one example, upon receiving the current versions of the data subtypes from the first HMD device 28, the synchronization program 14 may be configured to programmatically provide or "push" to the second HMD device 32 identifiers that identify each of the plurality of data subtypes and the current version of each of the data subtypes that were received. In this manner, the synchronization program 14 may provide continuous updates to the second HMD device 32 that identify the current versions of the data subtypes received by the program. As described in more detail below, the second HMD device 32 may then determine whether to request one or more of the data subtypes identified by the data subtype identifiers.

In another example, the synchronization program 14 may not programmatically provide the identifiers as described above. Instead, the synchronization program 14 may be configured to receive a neighborhood request 86 from the second HMD device 32 via computing device 36. With reference to FIG. 3, in one example the second user 308 may enter the room 312 and, at least initially, may not share a mixed reality experience with the first user 304. Accordingly, the second HMD device 32 may be unaware of the holographic wizard 320 that is part of the mixed reality environment experienced by the first user 304.

The second HMD device 32 may then submit a neighborhood request 86 to the data collaborator 12 that includes a keyframe location, such as keyframe location 8. In one example, keyframe location 8 may be selected based on its proximity to the second HMD device 32. Upon receiving the neighborhood request 86, the synchronization program 14 may identify the keyframe location 8 in the request and, based on the keyframe location, provide to the second HMD device 32 an identifier 92 for each of data subtype A and data subtype B that are associated with keyframe location 8. Along with the identifiers, the synchronization program 14 provides a current version indicator 88, such as the indicator number 1, for each of the data subtypes.

It will also be appreciated that the synchronization program 14 may also provide one or more additional data subtype identifiers and corresponding version number indicators that are associated with keyframe location 8 and stored in world map data structure 80. Such additional data subtype identifiers and version number indicators may have been previously received from the first HMD device 28 and/or other sources.

As shown in FIG. 1, in one example the computing device 36 associated with the second HMD device 32 may have no data for data subtype A or data subtype B at keyframe location 8, which is represented by version 0 for both data subtypes. Upon receiving the identifiers 92 for each of data subtype A and data subtype B associated with keyframe location 8, and the current version indicators 88 showing the number 1, the second HMD device 32 may determine that its version 0 for both data subtypes is non-current. The second HMD device 32 may then send a data request 90 including an identifier 92 for each of data subtype A and data subtype B associated with keyframe location 8, and non-current version indicators 94 showing the number 0, to the data collaborator 12.

In one example, the second HMD device 32 may prioritize data subtype A and data subtype B based on the priority hierarchy 84, as described above. In this example, the data request 90 may further include the prioritization of data subtype A and data subtype B, which prioritization advantageously may be utilized by the synchronization program 14 to optimize an order in which the data subtypes are subsequently provided to the second HMD device 32 and/or other recipients.

The synchronization program 14 is configured to receive the data request 90. Where the data request 90 does not include a prioritization, the synchronization program 14 is configured to prioritize data subtype A and data subtype B based on the priority hierarchy 84. The synchronization program 14 may compare the non-current version indicators 94 in the data request 90 with the current version indicators 88 for the corresponding data subtypes. Based on this comparison, the synchronization program 14 may select the current version (version 1) of each of data subtype A and data subtype B for provision to the second HMD device 32.

Accordingly, and based on the prioritization of data subtype A and data subtype B, the synchronization program is configured to sequentially provide the current version 1 of the data subtypes A and B to the second HMD device 32. In this example, data subtype B is accorded a higher priority than data subtype A, and is therefore provided first to the second HMD device 32. With reference again to FIG. 3, the second HMD device 32 may utilize the current version 1 of the data subtype A and data subtype B to augment an appearance of the virtual environment 46 generated by the device to display the holographic wizard 320 in keyframe location 8.

In another example, the second user 308 may have been in the room 312 earlier in the day, and the second HMD device 32 may have captured various data subtypes corresponding to the room 312, such as images of the table 324. The second HMD device 32 may have uploaded those images to the data collaborator 12, while also keeping a local copy of the images. Later, upon returning to the room 312, the second HMD device 32 may send a neighborhood request to the data collaborator 12 for corresponding keyframe location 8. The second HMD device 32 may receive a plurality of data subtype identifiers 92 and corresponding current versions that relate to physical objects in the room, such as images of the table 324. The second HMD device 32 may send a data request 90 that includes data subtype identifiers including one or more images of the table 324.

Upon receiving the data request 90, the synchronization program 14 may determine that a previous version of a requested data subtype, such as an image of the table, was previously received from the second HMD device 32. Accordingly, the synchronization program 14 may determine that the second HMD device 32 already has a local copy of the image corresponding to the previous version of the data subtype. Thus, the synchronization program 14 may refrain from providing this previous version of the requested data subtype to the second display device. Advantageously, this eliminates the provision of previous versions of data subtypes to the second HMD device 32 that the device already has stored locally, thereby conserving network bandwidth and avoiding duplicate copies of data being transferred and stored on the device.

As described above, the mixed reality collaboration system 10 including the data collaborator 12 may enable two or more display devices to share mixed reality experiences with enhanced user experiences. For example, by utilizing priorities in determining an order of data to be uploaded and received by the data collaborator 12, the highest priority data will be made first available for download to other recipients. Such recipients may benefit by receiving this more useful data first, as it may enhance the user experience to a greater extent than lower priority data available for that particular location. Similarly, where multiple data subtypes are available for a location, a recipient may prioritize the order in which such data subtypes are received from the data collaborator 12. Advantageously, the data collaborator 12 may thereby reduce perceived latency and generally enhance the user experience.

Figure 4B:
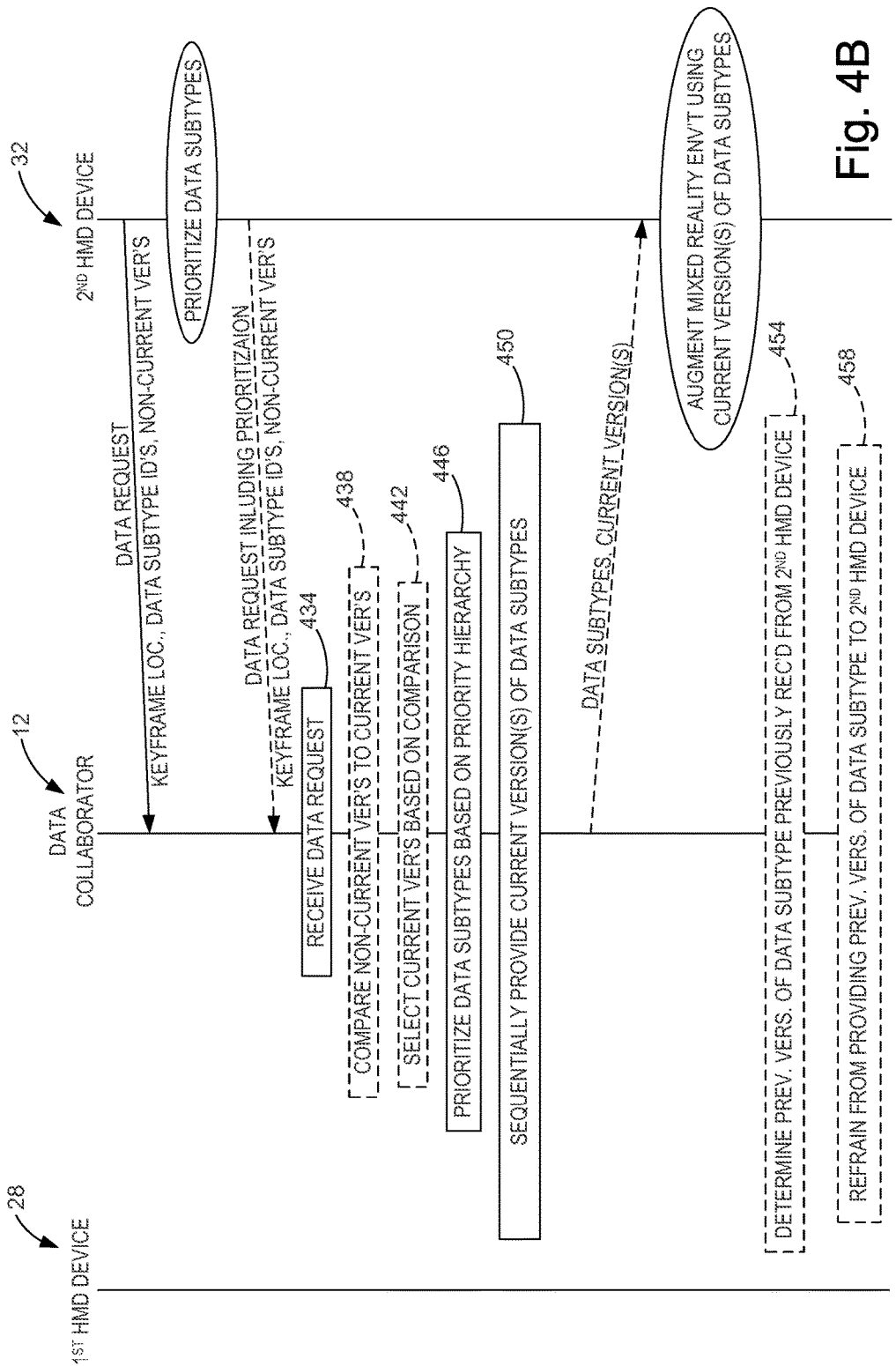

FIGS. 4A and 4B illustrate a flow chart of a method 400 for enabling two or more display devices, such as first HMD device 28 and second HMD device 32, to share mixed reality experiences according to an embodiment of the present disclosure. The description of method 400 is provided with reference to the software and hardware components of the mixed reality collaboration system 10 including data collaborator 12 described herein and shown in FIGS. 1-3. It will be appreciated that method 400 may also be performed in other contexts using other suitable hardware and software components.

With reference to FIG. 4A, at 402 the method 400 includes receiving a plurality of data subtypes from the first HMD device 28, with each of the data subtypes being geo-located at a keyframe location and having a current version. In another example, prior to providing the plurality of data subtypes, the first HMD device 28 may prioritize the data subtypes based on a priority hierarchy 84. In this example, at 408 the method 400 may include sequentially receiving the plurality of data subtypes from the first display device based on the priority hierarchy.

At 414 the method 400 may include updating a world map data structure to include the current versions of the data subtypes at the keyframe location. At 418 and in one example, the method 400 may include programmatically providing to the second HMD device 32 an identifier for each of the plurality of data subtypes and a current version indicator for each of the plurality of data subtypes received from the first HMD device 28.

In another example, at 422 the method 400 may include receiving a neighborhood request including the keyframe location from the second display device. At 426 the method 400 may include, in response to the neighborhood request and based on the keyframe location, providing to the second display device an identifier for each of the plurality of data subtypes and a current version indicator for each of the plurality of data subtypes associated with the keyframe location.

With reference now to FIG. 4B, at 434 the method 400 may include receiving a data request from the second HMD device 32 for two or more of the plurality of data subtypes. The data request may include the keyframe location, identifiers and a non-current version indicator for each of the two or more data subtypes. In one example, the second display device may prioritize the data subtypes based on the priority hierarchy 84, as described above. In this example, the data request may further include the prioritization of the data subtypes.

At 438 the method 400 may include comparing the non-current version indicators in the data request with the current version indicators for the corresponding data subtypes. At 442 the method 400 may include, based on this comparison, selecting the current version of each of the data subtypes for provision to the second HMD device 32. Where the data request does not include a prioritization, at 446 the method 400 includes prioritizing the two or more data subtypes based on the priority hierarchy. At 450 the method 400 may include, based on the prioritization, sequentially providing the current versions of the two or more data subtypes to the second display device. Using these current versions, the second display device may augment an appearance of the mixed reality environment generated via the second display device.

In another example and at 454, the method 400 may include determining that a previous version of one of the requested two or more data subtypes was previously received from the second display device. At 458 and based on this determination, the method 400 may include refraining from providing the previous version of the one of the requested data subtypes to the second display device.

It will be appreciated that method 400 is provided by way of example and is not meant to be limiting. Therefore, it is to be understood that method 400 may include additional and/or alternative steps than those illustrated in FIGS. 4A and 4B. Further, it is to be understood that method 400 may be performed in any suitable order. Further still, it is to be understood that one or more steps may be omitted from method 400 without departing from the scope of this disclosure.

Figure 5:
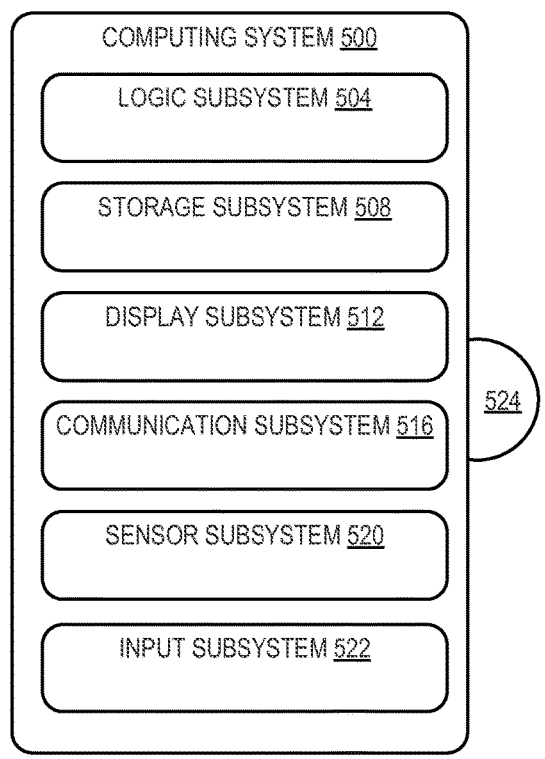
FIG. 5 is a simplified schematic illustration of an embodiment of a computing device.

FIG. 5 schematically shows a nonlimiting embodiment of a computing system 500 that may perform one or more of the above described methods and processes. Data collaborator 12 may take the form of computing system 500. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc. As noted above, in some examples the computing system 500 may be integrated into an HMD device.

As shown in FIG. 5, computing system 500 includes a logic subsystem 504 and a storage subsystem 508. Computing system 500 may optionally include a display subsystem 512, a communication subsystem 516, a sensor subsystem 520, an input subsystem 522 and/or other subsystems and components not shown in FIG. 5. Computing system 500 may also include computer readable media, with the computer readable media including computer readable storage media and computer readable communication media. Computing system 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem 504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 508 may include one or more physical, persistent devices configured to hold data and/or instructions executable by the logic subsystem 504 to implement the herein described methods and processes. When such methods and processes are implemented, the state of storage subsystem 508 may be transformed (e.g., to hold different data).

Storage subsystem 508 may include removable media and/or built-in devices. Storage subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 508 may include devices with one or more of the following characteristics: volatile, nonvolatile, dynamic, static, read/write, read-only, random access, sequential access, location addressable, file addressable, and content addressable.

In some embodiments, aspects of logic subsystem 504 and storage subsystem 508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 5 also shows an aspect of the storage subsystem 508 in the form of removable computer readable storage media 524, which may be used to store data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that storage subsystem 508 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 512 may be used to present a visual representation of data held by storage subsystem 508. As the above described methods and processes change the data held by the storage subsystem 508, and thus transform the state of the storage subsystem, the state of the display subsystem 512 may likewise be transformed to visually represent changes in the underlying data. The display subsystem 512 may include one or more display devices utilizing virtually any type of technology. Such display devices may be combined with logic subsystem 504 and/or storage subsystem 508 in a shared enclosure, or such display devices may be peripheral display devices. The display subsystem 512 may include, for example, the display system 48 and transparent display 52 of the second HMD device 32.

When included, communication subsystem 516 may be configured to communicatively couple computing system 500 with one or more networks and/or one or more other computing devices. Communication subsystem 516 may include wired and/or wireless communication devices compatible with one or more different communication protocols. As nonlimiting examples, the communication subsystem 516 may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

Sensor subsystem 520 may include one or more sensors configured to sense different physical phenomenon (e.g., visible light, infrared light, sound, acceleration, orientation, position, etc.) as described above. Sensor subsystem 520 may be configured to provide sensor data to logic subsystem 504, for example. As described above, such data may include eye-tracking information, image information, audio information, ambient lighting information, depth information, position information, motion information, user location information, and/or any other suitable sensor data that may be used to perform the methods and processes described above.

When included, input subsystem 522 may comprise or interface with one or more sensors or user-input devices such as a game controller, gesture input detection device, voice recognizer, inertial measurement unit, keyboard, mouse, or touch screen. In some embodiments, the input subsystem 522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality collaboration system 10 that is implemented to perform one or more particular functions. In some cases, such a program may be instantiated via logic subsystem 504 executing instructions held by storage subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data collaborator for enabling two or more display devices to share mixed reality experiences, the data collaborator comprising:
  a processor configured to:
    receive a plurality of data subtypes from a first display device, each of the data subtypes being geo-located at a keyframe location, having a current version, and including physical environment data and virtual environment data;
    update a world map data structure to include the current versions of the data subtypes at the keyframe location;
    receive a neighborhood request including the keyframe location from a second display device;
    in response to the neighborhood request and based on the keyframe location, provide to the second display device an identifier for each of the plurality of data subtypes that identifies a subtype of each of the plurality of data subtypes and a current version indicator for each of the plurality of data subtypes, and not provide any of the plurality of data subtypes to the second display device;
    receive a data request from the second display device for two or more of the plurality of data subtypes, the data request including the identifier for each of the two or more data subtypes;
    prioritize the two or more data subtypes based on a priority hierarchy, the priority hierarchy prioritizing one of a transform data subtype and an image data subtype above the other of the transform data subtype and the image data subtype; and
    based on the prioritization, sequentially provide current versions of the two or more data subtypes to the second display device such that a first data subtype is provided to the second display device before a second data subtype, wherein an appearance of a mixed reality environment generated via the second display device is augmented using the current versions of the two or more data subtypes.

2. The data collaborator of claim 1, wherein the data request includes a non-current version indicator for each of the two or more data subtypes.

3. The data collaborator of claim 2, wherein the processor is further configured to:
  compare the non-current version indicators to the current version indicators for the two or more data subtypes; and
  based on the comparison, select the current versions of the two or more data subtypes for provision to the second display device.

4. The data collaborator of claim 1, wherein the plurality of data subtypes are prioritized by the first display device based on the priority hierarchy, and the plurality of data subtypes are sequentially received from the first display device based on the priority hierarchy.

5. The data collaborator of claim 1, wherein the plurality of data subtypes are prioritized by the second display device based on the priority hierarchy, and the data request from the second display device includes a prioritization of the two or more data subtypes based on the priority hierarchy.

6. The data collaborator of claim 1, wherein prior to receiving the neighborhood request from the second display device and in response to receiving the plurality of data subtypes from the first display device, the processor is further configured to provide to the second display device the identifiers that identify each of the plurality of data subtypes and the current version of each of the plurality of data subtypes received from the first display device.

7. The data collaborator of claim 1, wherein the processor is further configured to:
   determine that a previous version of one of the two or more data subtypes was previously received from the second display device; and
   based on this determination, refrain from providing the previous version of the one of the two or more data subtypes to the second display device.

8. The data collaborator of claim 1, wherein the data subtypes are selected from the group consisting of pose link transforms, anchor transforms, tracking images, scene images, correspondences between two-dimensional image coordinates and three-dimensional locations, keyframe metadata, keyframe descriptors, three-dimensional keyframe relocalization points, quantizations of keyframe descriptors, and rig-to-rig transforms.

9. The data collaborator of claim 1, wherein the priority hierarchy comprises a first priority that includes anchor transforms, a second priority that includes scene images, and a third priority that includes three-dimensional keyframe relocalization points.

10. The data collaborator of claim 1, wherein the second display device is a head-mounted display device.

11. A method for enabling two or more display devices to share mixed reality experiences, the method comprising:
    receiving a plurality of data subtypes from a first display device, each of the data subtypes being geo-located at a keyframe location, having a current version, and including physical environment data and virtual environment data;
    updating a world map data structure to include the current versions of the data subtypes at the keyframe location;
    receiving a neighborhood request including the keyframe location from a second display device;
    in response to the neighborhood request and based on the keyframe location, providing to the second display device an identifier for each of the plurality of data subtypes that identifies a subtype of each of the plurality of data subtypes and a current version indicator for each of the plurality of data subtypes, and not providing any of the plurality of data subtypes to the second display device;
    receiving a data request from the second display device for two or more of the plurality of data subtypes, the data request including the identifier for each of the two or more data subtypes;
    prioritizing the two or more data subtypes based on a priority hierarchy, the priority hierarchy prioritizing one of a transform data subtype and an image data subtype above the other of the transform data subtype and the image data subtype; and
    based on the prioritization, sequentially providing current versions of the two or more data subtypes to the second display device such that a first data subtype is provided to the second display device before a second data subtype, wherein an appearance of a mixed reality environment generated via the second display device is augmented using the current versions of the two or more data subtypes.

12. The method of claim 11, wherein the data request includes a non-current version indicator for each of the two or more data subtypes.

13. The method of claim 12, further comprising:
    comparing the non-current version indicators to the current version indicators for the two or more data subtypes; and
    based on the comparison, selecting the current versions of the two or more data subtypes for provision to the second display device.

14. The method of claim 11, wherein the plurality of data subtypes are prioritized by the first display device based on the priority hierarchy, and the method further comprises sequentially receiving the plurality of data subtypes from the first display device based on the priority hierarchy.

15. The method of claim 11, wherein the plurality of data subtypes are prioritized by the second display device based on the priority hierarchy, and the data request from the second display device includes a prioritization of the two or more data subtypes based on the priority hierarchy.

16. The method of claim 11, further comprising, prior to receiving the neighborhood request from the second display device and in response to receiving the plurality of data subtypes from the first display device, providing to the second display device the identifiers that identify each of the plurality of data subtypes and the current version of each of the plurality of data subtypes received from the first display device.

17. The method of claim 11, further comprising:
    determining that a previous version of one of the two or more data subtypes was previously received from the second display device; and
    based on this determination, refraining from providing the previous version of the one of the two or more data subtypes to the second display device.

18. The method of claim 11, wherein the data subtypes are selected from the group consisting of pose link transforms, anchor transforms, tracking images, scene images, correspondences between two-dimensional image coordinates and three-dimensional locations, keyframe metadata, keyframe descriptors, three-dimensional keyframe relocalization points, quantizations of keyframe descriptors, and rig-to-rig transforms.

19. The method of claim 11, wherein the priority hierarchy comprises a first priority that includes anchor transforms, a second priority that includes scene images, and a third priority that includes three-dimensional keyframe relocalization points.

20. A method for enabling two or more head-mounted display devices to share mixed reality experiences, the method comprising:
    receiving a plurality of data subtypes from a first head-mounted display device, each of the data subtypes being geo-located at a keyframe location, having a current version, and including physical environment data and virtual environment data;
    updating a world map data structure to include the current versions of the data subtypes at the keyframe location;
    receiving a neighborhood request including the keyframe location from a second head-mounted display device;
    in response to the neighborhood request and based on the keyframe location, providing to the second head-mounted display device an identifier for each of the plurality of data subtypes that identifies a subtype of each of the plurality of data subtypes and a current version indicator for each of the plurality of data subtypes, and not providing any of the plurality of data subtypes to the second head-mounted display device;
    receiving a data request from the second head-mounted display device for two or more of the plurality of data subtypes, the data request including the identifier for each of the two or more data subtypes and a non-current version indicator for each of the two or more data subtypes;
comparing the non-current version indicators to the current version indicators for the data subtypes;
based on the comparison, selecting the current versions of the two or more data subtypes for provision to the second head-mounted display device;
prioritizing the two or more data subtypes based on a priority hierarchy, the priority hierarchy prioritizing one of a transform data subtype and an image data subtype above the other of the transform data subtype and the image data subtype; and
based on the prioritization, sequentially providing the current versions of the two or more data subtypes to the second head-mounted display device such that a first data subtype is provided to the second head-mounted display device before a second data subtype, wherein an appearance of a mixed reality environment generated via the second head-mounted display device is augmented using the current versions of the two or more data subtypes.

\* \* \* \* \*